United States Patent [19]

Fair et al.

[11] 3,777,843
[45] Dec. 11, 1973

[54] SEISMIC VIBRATOR SYSTEM

[75] Inventors: Delbert W. Fair; Graydon L. Brown; J. H. Miller, Jr., all of Ponca City, Okla.

[73] Assignee: Continental Oil Company, Ponca City, Okla.

[22] Filed: Oct. 18, 1971

[21] Appl. No.: 190,161

[52] U.S. Cl. ........................................ 181/.5 VM
[51] Int. Cl. ............................................ G01v 1/14
[58] Field of Search .................. 181/.5 VM, .5 EC, 181/.5 H, .5 EM

[56] References Cited
UNITED STATES PATENTS

| | | | |
|---|---|---|---|
| 3,306,392 | 2/1967 | Kilmer | 181/.5 DC |
| 3,024,861 | 3/1962 | Clynch | 181/.5 VM |
| 3,393,763 | 7/1968 | Sundt | 181/.5 VM |
| 3,306,391 | 2/1967 | Bays | 181/.5 VM |
| 3,363,120 | 1/1968 | Mifsud et al. | 181/.5 VM |

*Primary Examiner*—Benjamin A. Borchelt
*Assistant Examiner*—J. V. Doramus
*Attorney*—Joseph C. Kotarski et al.

[57] ABSTRACT

A seismic vibrator system for installation on the frame of a ground vehicle including a pair of two-way power cylinders each pivotally secured at one end thereof to the frame and fixedly secured at the opposite end thereof to a cross member. A vibrator is connected to each end of the cross member by means of a vibration-isolating air spring. The lower ends of the vibrators are secured to an earth-engaging base. Lifting members, interconnecting the vibrator and the cross member, are disclosed for lifting the vibrators and base in response to extension of the power cylinders. Extension and retraction of the two-way power cylinders alternately raises the vibrators and base from the ground for travel and lowers them to the ground for transmission of seismic shock waves into the ground. The cross member and power cylinders are adapted to be vibrationally isolated from the vibrators and base when the base is in contact with the ground. In operation the vehicle is partially supported by the base and the vibrators acting through the vibration isolating air springs.

2 Claims, 8 Drawing Figures

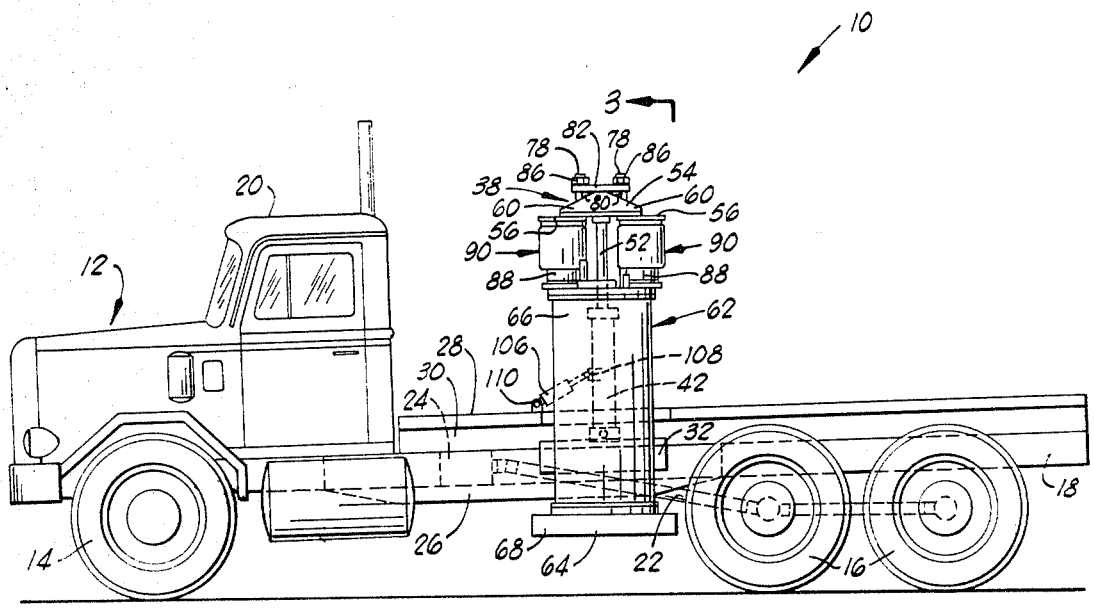
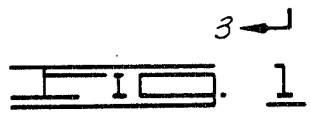
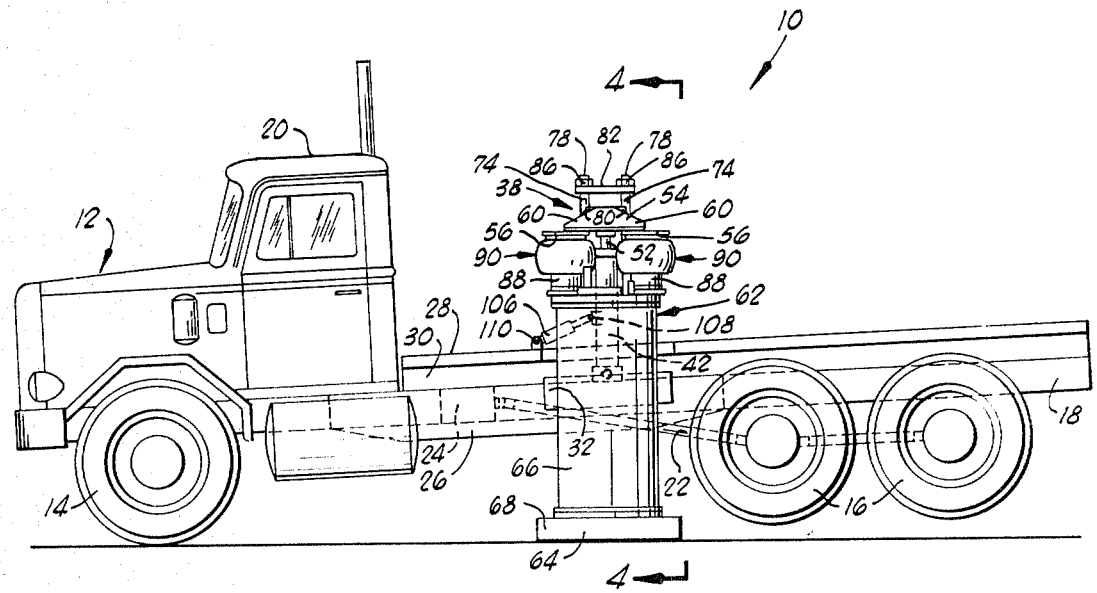
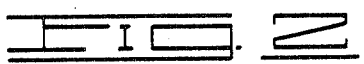

INVENTORS
DELBERT W. FAIR,
GRAYDON L. BROWN
J. H. MILLER JR.
BY
William J. Miller
ATTORNEY

INVENTORS
DELBERT W. FAIR,
GRAYDON L. BROWN &
J. H. MILLER JR.

BY
*William J. Miller*
ATTORNEY

SEISMIC VIBRATOR SYSTEM

BACKGROUND OF THE INVENTION

1. Field of the Invention

This invention relates to improvements in seismic vibrator systems and more particularly, but not by way of limitation, to improvements in apparatus for raising and lowering a low frequency vibrator system and isolating the vibrations thereof from a supporting vehicle frame.

2. Description of the Prior Art

The vibrator truck-mounted units now in use comprise one vibrator mounted in the middle of a base plate and, because of the position of the vehicle drive shaft, the units have to be mounted on a stilt structure connecting the vibrator to the base plate. This type of vibrator unit design imposes detrimental limitations on the reaction mass size and weight, force output, and stroke length available to the vibrator unit. Some additional detrimental characteristics of the existing vibrator units are rocking of the base plate during operation, high center of gravity of the unit, and unequal force distribution to the base plate. An example of the presently available vibrator units is illustrated in the patent to Bays, U.S. Pat. No. 3,306,391.

The lift and isolation apparatus for the presently available vibrator units do not possess the degree of freedom required for a large force output, low frequency vibrator. The conventional lift and isolation apparatus are characterized by mounting the vibration isolators on the base plate. Relatively large steel standards interconnect the isolation system and the lift system. These standards are guided by sliding bearing housings which are rigidly fixed to the truck frame thereby limiting the lift system to up and down movement only. This limitation to the movement of the lift system makes it necessary to move the truck carrying the vibrator unit when the base plate engages uneven ground.

SUMMARY OF THE INVENTION

The present invention contemplates a seismic vibrator system which includes a frame. An extendable member having opposite ends is pivotally secured at one end thereof to the frame, the opposite end thereof extending upwardly from the frame. A cross member having opposite end portions is fixedly secured to the opposite end of the extendable member. Means for inducing vibrations in the earth is disposed beneath the cross member. Lifting means interconnects the vibration inducing means and the cross member, the lifting means being adapted to permit limited movement of the vibration inducing means relative to the cross member and to suspend the vibration means beneath the cross member when the vibration means has reached the maximum limit of movement from the cross member. Isolating means are disposed between the cross member and the vibration inducing means for isolating the vibrations of the vibration inducing means from the cross member.

An object of the present invention is to provide a seismic vibrator system having improved operating characteristics.

Another object of the present invention is to provide a seismic vibrator system having improved vibrator isolation characteristics.

A further object of the present invention is to provide a seismic vibrator system which allows the use of the largest possible reaction mass, stroke and force output for a mobile truck-mounted unit.

A still further object of the present invention is to provide a seismic vibrator system which is economical in construction and operation.

Other objects and advantages of the present invention will be evident from the following detailed description when read in conjunction with the accompanying drawings.

BRIEF DESCRIPTION OF THE DRAWINGS

FIG. 1 is a side elevational view of the apparatus of the present invention installed on a truck and in a raised position for transport.

FIG. 2 is a side elevational view of the apparatus of FIG. 1 in a lowered position engaging the ground for generation of a seismic signal.

FIG. 5 is a fragmentary cross-sectional view taken along line 5—5 of FIG. 3.

FIG. 6 is a fragmentary cross-sectional view taken along line 6—6 of FIG. 3.

DESCRIPTION OF THE PREFERRED EMBODIMENT

Figure 3:
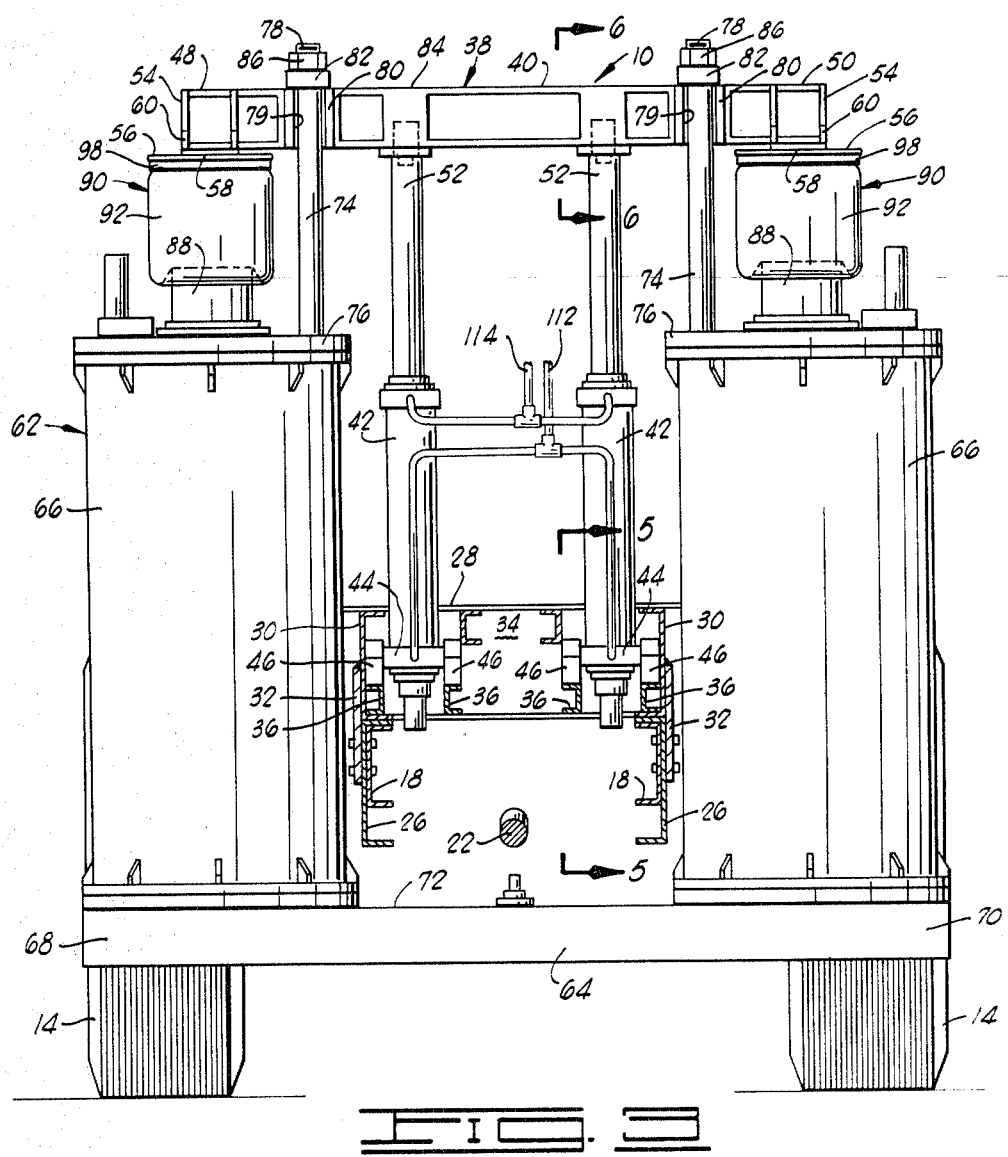
FIG. 3 is a cross-sectional view taken along line 3—3 of FIG. 1.
Figure 9:
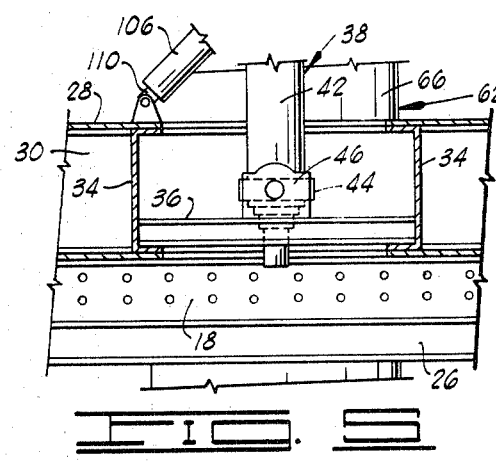

Referring now to the drawings, and to the FIGS. 1, 2, 3 and 4 in particular, reference character 10 generally designates a seismic vibrator system constructed in accordance with the present invention. The system 10 comprises a conventional truck 12 having front wheels 14 and rear wheels 16 which support a chassis comprised generally of frame channels 18 and a conventional cab 20 which houses a conventional engine (not illustrated). The engine is connected to drive the rear wheels 16 by a conventional drive train including a drive shaft 22. If necessary, the drive train may be slightly modified by including a universal journal box 24 which may be mounted on the frame 18 to raise the drive shaft 22. Two reinforcing channels 26 are connected to the channels 18 intermediate the front wheels 14 and the rear wheels 16. A bed 28 is connected to the frame channels 18 and the reinforcing channels 26 by a second pair of reinforcing channels 30. A splice plate 32 interconnects each reinforcing channel 26 and the adjacent reinforcing channel 30. The various plates and channels used to construct the present invention may be conveniently connected by welding or by use of bolts.

A pair of channels 34 extend between and are aligned normal to the reinforcing channels 30 and are suitably secured thereto such as by welding. The channels 34 are preferably located intermediate the front and rear wheels 14 and 16 and as close to the rear wheels 16 as practical. Four channels 36 extend between the channels 34 and are aligned parallel to the channels 30. Each channel 36 is secured at each end thereof to a respective channel 34 by suitable means such as welding.

A lifting assembly 38 comprising a cross member 40 and a pair of conventional two-way hydraulic power cylinders 42 is pivotally secured to the truck 12. The cylinder end portion 44 of each power cylinder 42 is journaled in a pair of pillow blocks 46, each pillow block 46 being fixedly secured to the medial portion of a respective channel 36.

The cross member 40, having opposite end portions 48 and 50, is fixedly secured to the rod end portion 52 of each two-way hydraulic power cylinder 42 intermediate the end portions 48 and 50. The cross member 40 may be conveniently formed of a structural steel I-beam.

A foot 54 is formed on each end portion 48 and 50 of the cross member 40. Each foot 54 extends outwardly from the cross member 40 and is aligned generally with the longitudinal axis of the truck frame 18. A circular plate 56, lying in a substantially horizontal plane, is fixedly secured to the lower face 58 of each end portion 60 of each foot 54. The function of the four circular plates 56 will be described in greater detail hereinafter.

Figure 8:
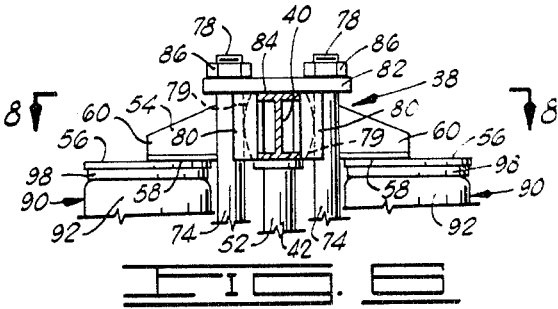
FIG. 8 is a fragmentary cross-sectional view taken along line 8—8 of FIG. 6.

A vibrator assembly 62 comprising a base plate 64 and two vibrator units 66 is disposed beneath the cross member 40. The base plate 64 has opposite end portions 68 and 70 and is of a length substantially equal to the overall width of the truck 12. One vibrator unit 66 is mounted on the upper portion 72 of the base plate 64 and adjacent to the end portion 68 thereof. The second vibrator unit 66 is mounted on the upper portion 70 thereof. A pair of parallel guide rods 74 extend vertically upward from the upper portion 76 of each vibrator unit 66. The upper end portion 78 of each guide rod 74 is slidably received in an arcuately shaped concave contact surface 79 formed in a respective bearing plate 80 formed on one side of the cross member 40. The upper end portions 78 of each pair of guide rods 74 extend through a lifting bar 82 which extends across the upper surface 84 of the cross member 40. A nut 86 is threadedly secured to the upper end portion 78 of each guide rod 74 to secure the lifting bars 82 to the respective guide rods 74. It should be noted that the contact surface 79 of each bearing plate 80 is formed of a suitable material such as bronze to facilitate low friction sliding movement of the guide rods 74 along the bearing plates 80. See FIGS. 6 and 8.

A pair of pedestals 88 having a cylindrically shaped outer periphery are mounted on the upper portion 76 of each vibrator unit 66 and extend vertically upward therefrom. Each pedestal 88 is in vertical axial alignment with a respective circular plate 56 carried by the cross member 40 above. Each of the four pedestals 88 is connected to a respective circular plate 56 by a vibration isolator 90.

Figures 7, 8:
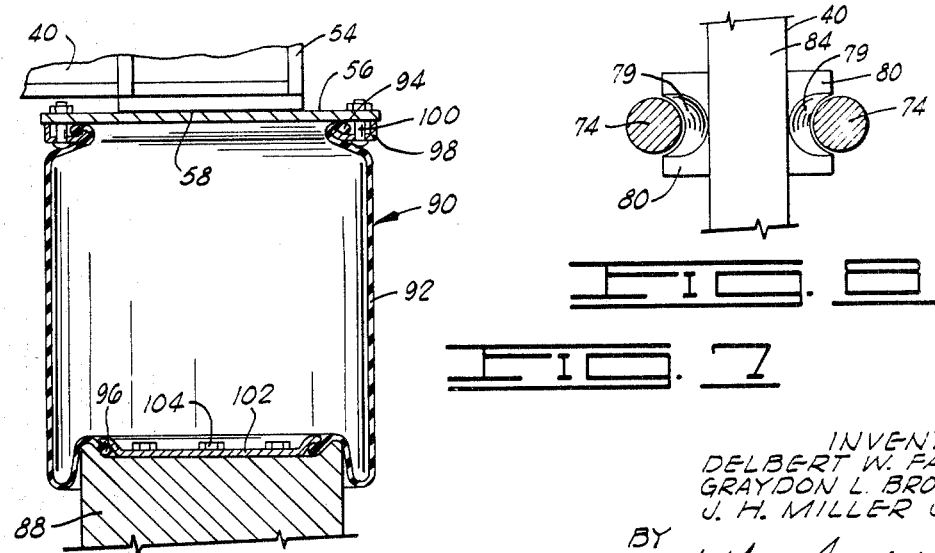
FIG. 7 is a fragmentary cross-sectional view illustrating the construction of one vibration isolator.

Each vibration isolator 90 is in the form of an air tight air spring and comprises an air tight air bag 92, preferably formed of a suitable elastomatic such as rubber, and having an annular upper bead 94 and an annular lower bead 96 formed threron. See FIG. 7. An upper seal ring 98 sealingly engages the upper bead 94 to the circular plate 56 by means of a plurality of circumferentially spaced bolts 100. A dish-shaped circular seal member 102 sealingly engages the lower bead 96 to the pedestal 88 by means of a plurality of spaced bolts 104. The air pressure within each air tight vibration isolator 90 may be adjusted through a conventional air valve mounted in the circular plate 56 (not shown).

The lifting assembly 38 is retained in a generally upright position normal to the bed 28 of the truck 12 by means of a two-way biasing apparatus 106 which interconnects each two-way hydraulic power cylinder 42 and one channel 34. One end 108 of each apparatus 106 is pivotally secured to a respective power cylinder 42. The opposite end 110 of each apparatus 106 is pivotally secured to the upper flange of a channel 34 as more clearly illustrated in FIG. 5. Any pivotal movement of a power cylinder 42 about its pivotal connection with the respective pillow blocks 46 and away from a position substantially normal to the bed 28 of the truck 12 causes a resulting compression of a spring carried in the respective apparatus 106 which spring urges the power cylinder 42 back to the upright position. Each apparatus 106 may comprise a conventional cylinder and a piston rod arrangement in which two axially opposed coil springs carried within the cylinder react against the piston to center it axially within the cylinder. As is readily apparent, maximum compression of either coil spring provides a positive stop to limit pivotal movement of the respective power cylinder 42. Such an arrangement is well known in the art and is not described in detail herein. It should be noted, however, that other convenient means may be utilized to bias the power cylinders 42 into a generally upright position.

OPERATION OF THE PREFERRED EMBODIMENT

To operate the apparatus of the present invention it will be assumed that the seismic vibrator system 10 is first in the transport position as illustrated in FIGS. 1 and 3. To place the system in this position the lifting assembly 38 is placed in the lift position by applying hydraulic pressure from a conventional source of pressurized hydraulic fluid (not shown) to hydraulic line 112 which in turn acts on the piston end of the piston in each power cylinder 42 thereby fully extending both power cylinders 42. Simultaneously, hydraulic fluid is bled off line 114. As can be seen in FIG. 3 the extension of the power cylinders 42 raises the cross member 40 which in turn lifts the vibrator assembly 62 by means of the two lifting bars 82 and the four guide rods 74. In the transport position it may be seen that the vibrator assembly 62 is entirely supported above the ground by the guide rods 74 and the lifting bars 82 secured thereto. The two-way biasing apparatus 106 retains the lifting assembly 38 in the upright position when in the transport position.

When the seismic vibrator system 10 is in proper position to begin operation, hydraulic pressure is raised in line 114 and hydraulic fluid is bled off line 112. The increased hydraulic pressure in line 114 acts on the rod side of each piston in each power cylinder 42 thereby retracting the power cylinders 42 until the base plate 64 of the vibrator assembly 62 engages the ground. During the transition from the transport position to the ground engaging position the vibrator assembly 62 remains suspended from the cross member 40 as described above.

Figure 4:
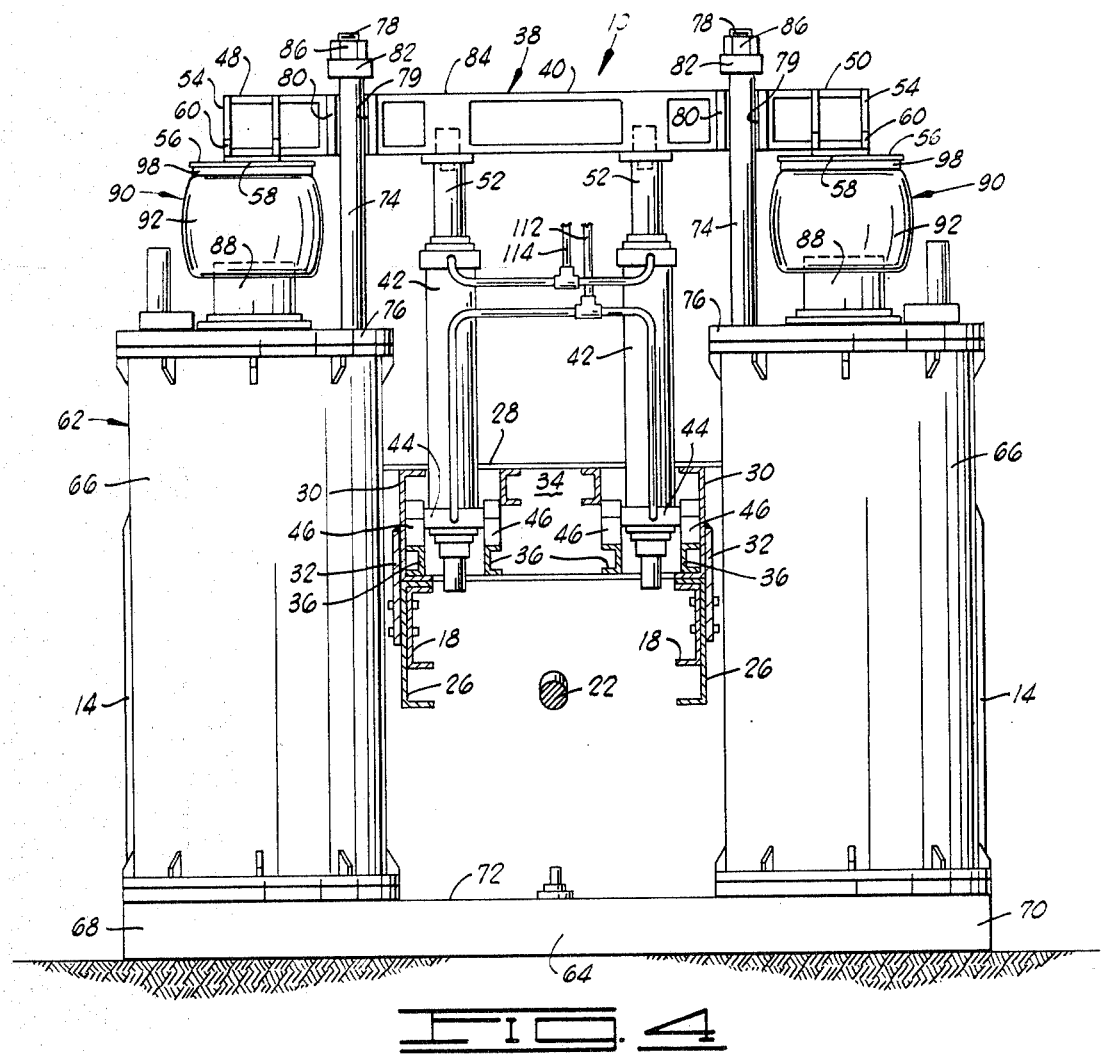
FIG. 4 is a cross-sectional view taken along line 4—4 of FIG. 2.

After the base plate 64 has reached the ground engaging position, the power cylinders 42 are retracted further. As shown in FIGS. 2 and 4, this additional retraction of the power cylinders 42 causes the truck 12 to be partially supported by the vibrator assembly 62 to the extent that the rear wheels 16 of the truck 12 are lifted from the ground. Further, as shown in FIG. 4, the guide rods 74 slide upward relative to the cross member 40 in sliding contact with the bearing plates 80. The weight of the truck 12 is transmitted through the frame 18 threrof through the lifting assembly 38 and the vibration isolators 90 to the vibrator assembly 62. This transmission of the weight of the truck 12 to the vibrator assembly 62 serves to hold the base plate 64 in more intimate contact with the surface of the ground during operation of the vibrators 66.

When the vibrators 66 are activated, the vibration isolators 90 greatly attenuate the vibrations thereof before they can be transmitted to the truck 12. Since the guide rods 74 are adapted to slide freely on the bearing plates 80, virtually no vibration is transmitted therethrough to the truck 12.

In the event it is necessary to place the vibrator assembly 62 on uneven ground, the lifting assembly 38 is permitted to pivot about the pivotal connections of the power cylinders 42 in the respective pillow blocks 46. Also, the vibrator assembly 62 is free to pivot about the longitudinal axis of the cross member 40 of the lifting assembly 38. The later pivotal movement is accomplished by the guide rods 74 sliding in the arcuately shaped concave contact surfaces 79 of the respective bearing plates 80. The above-mentioned pivotal movements of the lifting assembly 38 and the vibrator assembly 62 allow the vibrator assembly 62 to engage uneven ground without requiring movement of the truck 12. While in such an operating position, the urging of the two-way biasing apparatus 106 is overcome. However, when the vibrator assembly 62 is again raised to the transport position the two-way biasing apparatus 106 will again urge the lifting assembly 38 into a generally upright position normal to the bed 28 of the truck 12.

It should be noted that although the lifting assembly 38, the vibration isolators 90 and the vibrator assembly 62 are preferably mounted on the truck 12 intermediate the front and rear wheels 14 and 16, it may be desirable in certain applications to mount them to the rear of the rear wheels 16. The preferred mounting location, however, provides optimum transfer of the weight of the truck onto the base 64 of the vibrator assembly 62.

From the foregoing detailed description it can be readily seen that the present invention provides an improved seismic vibrator system which exhibits improved vibrator isolation characteristics and permits the use of the largest possible reaction mass, stroke and force output in the vibrators. It may be readily observed that the seismic vibrator system of the present invention is economical in construction and operation.

Changes may be made in the construction and arrangement of parts or elements of the seismic vibrator system as described herein without departing from the spirit and scope of the present invention.

What is claimed is:

1. A seismic vibrator system comprising:
    a frame;
    an extendable member having opposite ends and pivotally secured at one end thereof to said frame, the opposite end thereof extending upwardly from said frame;
    a cross member having opposite end portions and fixedly secured to the opposite end of said extendable member;
    vibrator means for inducing vibrations in the earth disposed beneath said cross member;
    lifting means interconnecting said vibrator means and said cross member, said lifting means being adapted for permitting limited movement of said vibrator means relative to said cross member and for suspending said vibrator means beneath said cross member when said vibrator means has reached a maximum limit of movement from said cross member;
    isolating means disposed between said cross member and said vibrator means for isolating the vibrations of said vibrator means from said cross member, said isolating means including at least one air spring interconnecting said cross member and said vibrator means; and
    said vibrator means including a first vibrator having an upper end portion and a lower end portion, said first vibrator being secured at the upper end portion thereof to at least one said air spring;
    a second vibrator having an upper end portion and a lower end portion, said second vibrator being secured at the upper end portion thereof to at least one said air spring;
    a base fixedly secured to the lower end portions of said first and second vibrators for engaging the surface of the earth; and
    said first and second vibrators being positioned, respectively, on opposite sides of said frame and said base being positioned beneath said frame.

2. A seismic vibrator system as defined in claim 1 wherein said lifting means is further characterized to include:
    a first pair of upwardly extending members fixedly secured to the upper end portion of said first vibrator and disposed on each side, respectively, of said cross member;
    a first lifting member fixedly secured to and interconnecting the upper end portions of said first pair of upwardly extending members and positioned above said cross member;
    a second pair of upwardly extending members fixedly secured to the upper end portion of said second vibrator and disposed on each side, respectively, of said cross member;
    a second lifting member fixedly secured to and interconnecting the upper end portions of said second pair of upwardly extending members and positioned above said cross member; and
    said first and second pairs of upwardly extending members being slidably received by said cross member.

* * * * *